United States Patent Office 3,657,184
Patented Apr. 18, 1972

3,657,184
POLYURETHANE ELASTOMERIC COMPOSITIONS EXHIBITING IMPROVED LIGHT STABILITY
Hiroyuki Segawa, Shozi Kurosaki, and Takuo Kawaguchi, Kurashiki, Japan, assignors to Kuraray Co., Ltd., Osaka, Japan
No Drawing. Filed June 11, 1970, Ser. No. 45,551
Claims priority, application Japan, June 27, 1969, 44/51,243
Int. Cl. C08g 51/60
U.S. Cl. 260—45.85                  8 Claims

ABSTRACT OF THE DISCLOSURE

Polyurethane elastomers are stabilized against degradation upon exposure to ultraviolet rays by incorporating therein from 0.1 to about 20% by weight, based on the elastomer, of a benzophenone having the general formula:

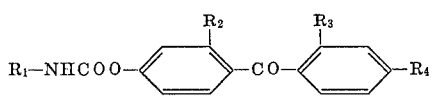

wherein $R_1$ represents an alkyl group having from about 8 to about 20 carbon atoms, $R_2$ and $R_3$ each represent a hydroxyl group or hydrogen with the proviso that both $R_2$ and $R_3$ are not hydrogen simultaneously, and $R_4$ represents hydrogen, a halogen such as chlorine or bromine, an alkoxy group having 1 to about 20 carbon atoms, an alkyl group having 1 to about 20 carbon atoms, or a hydroxyl group.

---

This invention relates to polyurethane elastomeric compositions exhibiting improved light stability. More particularly, this invention relates to ultraviolet ray absorbers and to the incorporation thereof into polyurethane elastomeric compositions to impart improved light stability thereto.

It is well known that polyurethanes undergo substantial yellowing and degradation under the influence of light, especially sunlight. In an effort to reduce or eliminate the adverse effects of light, ultraviolet ray absorbers such as benzophenones and benzotriazoles have been incorporated into polyurethanes to impart light stability thereto. It has been found, however, that most ultraviolet ray absorbers, when admixed into elastomeric compositions which are formed into filaments, fibers, films and the like tend to bloom, i.e. separate from such compositions and travel to the surface thereof by migration due to a poor affinity of the ultraviolet ray absorber for the polyurethane elastomer. Moreover, it has been found that these stabilizers are easily leached from the elastomer during many post-forming treatments, such as bleaching, dyeing, laundering, hot water treatment and the like. Consequently, use of such stabilizers does not insure the permanent stability of the elastomeric composition.

Accordingly, it is an object of the present invention to provide polyurethane elastomeric compositions exhibiting improved light stability.

It is another object of the present invention to provide a new class of ultraviolet ray absorbers which do not bloom and are not easily leached out of polyurethane elastomeric compositions containing said absorbers.

These as well as other objects are accomplished by the present invention which provides a new class of ultraviolet ray absorbers comprising benzophenones containing both a long chain alkyl group and a urethane group and having the general formula:

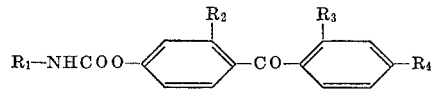

wherein $R_1$ represents an alkyl group having from about 8 to about 20 carbon atoms, $R_2$ and $R_3$ each represent a hydroxyl group or hydrogen with the proviso that both $R_2$ and $R_3$ cannot be hydrogen at the same time, and $R_4$ represents hydrogen, a halogen such as chlorine, bromine or the like, an alkoxy group having from 1 to about 20 carbon atoms, an alkyl group having from 1 to about 20 carbon atoms or a hydroxyl group.

It has been found in accordance with the present invention that to be effective, the ultraviolet ray absorber must have a long chain alkyl group having from about 8 to about 20 carbon atoms and a urethane group in the molecule of the benzophenone derivative. It has been found that if either moiety is absent, enhanced resistance to treatment with water cannot be obtained. The ultraviolet ray absorbers of the present invention do not undergo migration and are not observed on the surface of articles molded from the stabilized polyurethane elastomeric composition. Moreover, the ultraviolet ray absorbers of the present invention are not removed from the elastomeric composition by various post-forming treatments such as bleaching, dyeing, laundering, hot water treatment and the like. Therefore, the stabilized urethane elastomeric compositions of the present invention retain their stability for prolonged periods of time.

The ultraviolet ray absorbers of the present invention can be prepared according to the following reaction:

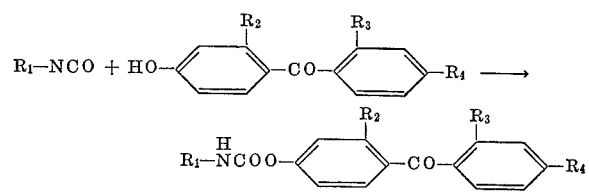

In general, the reaction involves the interaction of an alkyl isocyanate wherein the alkyl group contains from about 8 to about 20 carbon atoms and a benzophenone compound in molar ratios of about 1:1.

Alkyl isocyanates having from about 8 to about 20 carbon atoms which can be employed for purposes of this invention include, for example, such compounds as n-octyl isocyanate, 2-ethyl-hexyl isocyanate, n-decyl isocyanate, n-dodecyl isocyanate, n-tetradecyl isocyanate, n-octadecyl isocyanate and the like.

Benzophenone compounds which can be employed in the present invention are those such as 2,4-dihydroxy-benzophenone,
2,4-dihydroxy-4′-chlorobenzophenone,
2,4-dihydroxy-4′-methylbenzophenone,
2,4-dihydroxy-4′-methoxy-benzophenone,
4,2′-dihydroxy-benzophenone,
2,2′,4-trihydroxy-benzophenone,
2,2′,4,4′-tetrahydroxy-benzophenone and the like.

The reaction of the alkyl isocyanate and the benzophenone can be conducted at room temperature. If desired, however, the reaction can be hastened by heating or by conducting the reaction in the presence of a catalyst. Catalysts which are considered suitable for this purpose are catalysts which have been found useful in the production of polyurethanes such as for example trialkyl amine, triethylene diamine, organic stannous compounds and the like.

If desired, the reaction can be conducted in the presence of a solvent which is inert to the isocyanate group such as for example acetone, methyl-ethyl ketone, benzene, toluene, tetrahydrofuran, dimethyl-formamide and the like.

After completion of the reaction, the benzophenone derivatives of the present invention can be easily recovered by filtration and purified by recrystallization.

The term "polyurethane elastomers" as used throughout the specification and claims is intended to mean elastomers containing urethane linkages, urea linkages or acid amide linkages. For example, polyurethane elastomers can be produced by reacting a polyglycol having a molecular weight ranging from about 500 to about 6,000 and containing a hydroxyl group at both ends thereof, such as a polyester glycol or a polyether glycol, with an organic diisocyanate and, if necessary, a chain extender containing active hydrogen atoms, such as glycols, diamines, amino-alcohols, hydrazine or water. The methods of producing such polyurethane elastomers are well known in the art. For example, methods for preparing polyurethane elastomers are described in U.S. Pats. Nos. 2,755,266; 2,871,218; 2,899,411; 2,929,800; 2,929,802; 2,929,803; 2,957,852; 3,097,192; 3,296,212 and British Pats. Nos. 1,118,617 and 1,158,340. The disclosures in such patents regarding the production of polyurethane elastomers are incorporated herein by reference.

In accordance with the present invention, the amount of the benzophenone derivative incorporated into the polyurethane elastomer to effectively stabilize said elastomer against ultraviolet radiation ranges from about 0.1 to about 20 weight percent based on the elastomer and preferably ranges from about 1 to about 10 weight percent.

The benzophenone derivative can be blended with the polyurethane elastomer in any convenient manner. There is no restriction with respect to the state and/or form of the polyurethane elastomer. For example, the benzophenone derivative can be blended directly into the polyurethane elastomer itself or can be added to various solutions or dispersions of said elastomer.

To further enhance the light-stabilizing effect of the present invention, antioxidants such as phenols and diamines as, for example, described in U.S. Pats. Nos. 3,072,605 and 3,280,049 can be added to the elastomeric composition. Titanium dioxide and other conventional fillers and pigments can also be incorporated into the elastomeric composition, if desired. The stabilized compositions of the present invention can be employed in the form of filaments, films, coating materials or elastomeric shaped articles.

The following examples further define, described and compare methods of preparing the ultraviolet ray absorbers of the present invention and of utilizing them to stabilize elastomeric polyurethane compositions. Parts and percentages are by weight unless otherwise indicated.

EXAMPLE 1

2,005 parts of polybutylene adipate having a molecular weight of 2,005 and hydroxyl groups at both molecular ends, 1,020 parts of 4,4'-diphenylmethane diisocyanate and 271 parts of 1,4-butane diol were mixed together. The resulting reaction mixture was allowed to react in a nitrogen stream at 140° C. for 15 minutes and then at 220° C. for 15 minutes. The polyurethane elastomer thus obtained exhibited a relative viscosity $[\eta]=0.92$ (dimethylformamide was used as solvent). The resulting polyurethane was dissolved in dimethylformamide to form a 10 wt. percent solution, into which was then added and dissolved 4 wt. percent, based on polyurethane, of a benzophenone derivative according to the present invention which was obtained by the reaction of n-octadecyl isocyanate and 2,4-dihydroxy-benzophenone in a molar ratio of 1:1, and 2 wt. percent of an antioxidant which was obtained from the reaction between n-octyl isocyanate and 4,4'-butylidene-bis-(3-methyl-6-tert.butylphenol) in a molar ratio of 1:1. Films were prepared from the resulting solution by casting said solution and removing the solvent by evaporation. The transparency of the films was excellent and no traces of crystalline substances were observed on the film surfaces.

For comparison, films were prepared by the same process from an identical 10 wt. percent polyurethane solution in which had been added and dissolved 4 wt. percent, based on polyurethane, of 2 - hydroxy - 4 - octadecyloxy-benzophenone and 2 wt. percent of the antioxidant employed above. The resulting films were opaque and the surfaces thereof were patterned with 2-hydroxy-4-octadecyloxy-benzophenone crystals distributed thereon to produce a rough surface condition.

The films of the present invention and control films for comparison obtained as above were treated in boiling water and then irradiated with a Fade-O-Meter for 80 hours. The degrees of coloring of the films were as follows:

TABLE 1

| Time of treatment in boiling water | Degree of coloring after irradiation with Fade-O-Meter for 80 hours | |
|---|---|---|
| | Films of this invention | Control films |
| Hours: | | |
| 0 | Colorless | Faint yellow. |
| 1 | do | Light yellow. |
| 4 | do | Do. |
| 24 | Faint yellow | Yellow. |

The results of the above table show that the light resistance of the polyurethane compositions of the present invention is quite excellent.

EXAMPLE 2

To a 10 wt. percent solution of polyurethane in dimethylformamide prepared as described in Example 1, were added 2 wt. percent, based on the polyurethane, of a benzophenone derivative according to the present invention which was produced by the reaction between n-decyl isoyanate and 2,4,2' - trihydroxylbenzophenone in a molar ratio of 1:1, and 2 wt. percent of an antioxidant, i.e., 4,4'- butylidene - bis(3 - methyl - 6 - tert.butylphenol). Films were prepared from the resulting solution by casting said solution onto a glass plate and then evaporating off the solvent.

For comparison, films were also prepared by casting from an identical 10 wt. percent polyurethane solution in which 2 wt. percent of 2,4,4' - trihydroxybenzophenone and 2 wt. percent of 4,4' - butylidene-bis(3-methyl-6-tert.butylphenol) had been dissolved.

The films of the present invention and the control films were irradiated with a weather meter and the changes in strength and elongation were determined. The results are shown in Table 2:

TABLE 2

| | Films of this invention | | Control films | |
|---|---|---|---|---|
| Time of irradiation with weather meter | Strength (kg./mm.$^2$) | Elongation (percent) | Strength (kg./mm.$^2$) | Elongation (percent) |
| Hours: | | | | |
| 0 | 4.2 | 630 | 4.4 | 610 |
| 20 | 3.6 | 512 | 2.0 | 430 |
| 40 | 2.9 | 402 | 1.4 | 263 |
| 80 | 2.1 | 320 | 1.1 | 160 |

The results shown in the above Table 2 establish that polyurethane compositions of the present invention exhibit excellent weather resistance.

EXAMPLE 3

In the same manner as described in Example 1, 3 wt. percent based on polyurethane, of titanium dioxide (rutile type), 4 wt. percent of a benzophenone derivative according to the present invention which was produced by the reaction between n-decylisocyanate and 2,4-dihydroxybenzophenone in a molar ratio of 1:1, and 2 wt. percent of an antioxidant which was produced by the reaction between n-octyl isocyanate and 4,4' - butylidenebis - (3 - methyl - 6 - tert.butylphenol) in a molar ratio of 1:1 were added to a 10 wt. percent solution of the polyurethane prepared as described in Example 1. The films were cast from the solution.

For comparison, control films were cast from the same polyurethane solution in which had been added 3 wt. percent of titanium dioxide (rutile type), 4 wt. percent of the reaction product from 2,4 - tolylene diisocyanate and 2,4 - dihydroxybenzophenone in a molar ratio of 1:2 and 2 wt. percent of the same antioxidant described above.

The films of the present invention and the control films were immersed in a bleaching solution containing 5 g./l. of Actinol S–400 (a surface active agent trade name for a product of Matsumoto Yushi Co., Ltd.) and 2 g./l. of sodium pyrophosphate at 80° C. for three hours. Thereafter the films were irradiated with a Fade-O-Meter for 80 hours. No coloring was observed in the films of the present invention, while considerable coloring was observed in the control films.

EXAMPLE 4

130 parts of polytetramethylene glycol having a molecular weight of 1,300 and 45 parts of 4,4' - diphenylmethane diisocyanate were allowed to react in a nitrogen stream at 100° C. for two hours to synthesize a prepolymer having isocyanate groups at both ends. The prepolymer was diluted with dimethylformamide to obtain a prepolymer solution, in which was then added a solution of 6 parts of ethylene diamine in dimethylformamide at 20° C. to effect a chain extending reaction thereby obtaining a spinning solution of 15 wt. percent concentration. To the spinning solution was added and thereby dissolved, 2 wt. percent, based on polyurethane, of titanium dioxide (rutile type), 5 wt. percent of a benzophenone derivative according to the present invention formed by the reaction between n-octadecyl isocyanate and 2,4 - dihydroxy - 4' - methylbenzophenone in a molar ratio of 1:1 and 2 wt. percent of an antioxidant produced by the reaction between n-octyl isocyanate and 4,4'-butylidene - bis(3 - methyl - 6 - tert.butylphenol) in a molar ratio of 1:1. The spinning solution was spun from a nozzle having 50 holes into a coagulating bath comprising a 30 weight percent aqueous solution of dimethylformamide in a manner conventionally employed in wet spinning to obtain filaments of the present invention.

For comparison, control elastomeric filaments were prepared from the above spinning solution but in which had been added and dissolved 2 wt. percent of titanium dioxide (rutile type), 5 wt. percent of the reaction product of n-butylisocyanate and 2,4 - dihydroxy - 4' - methylbenzophenone in a molar ratio of 1:1 and 2 wt. percent of an antioxidant which was produced by the reaction between n-octyl isocyanate and 4,4' - butylidenebis - (3 - methyl - 6 - tert.butylphenol) in a molar ratio of 1:1.

After subjecting the elastomeric filaments of the present invention and those of the control to various treatments, they were irradiated with a Fade-O-Meter for 40 hours. The changes in the elastomeric filaments in strength and elongation are summarized in Table 3:

TABLE 3

| | Strength and elongation of elastomeric filaments after 40 hours Fade-O-Meter irradiation | | | |
|---|---|---|---|---|
| | Elastomeric filament of the present invention | | Elastomeric filaments for control | |
| Treatment conditions | Strength (g./d.) | Elongation (percent) | Strength (g./d.) | Elongation (percent) |
| 1. No treatment | 0.53 | 532 | 0.58 | 538 |
| 2. Treatment in boiling water for 2 hours | 0.50 | 501 | 0.42 | 410 |
| 3. Bleaching treatment (5 g./l. of Actinol S–400, 3 g./l. of sodium pyrophosphate 80° C., 90 minutes | 0.48 | 490 | 0.36 | 370 |

The above Table 3 demonstrates that the removal of stabilizer from polyurethane elastomeric filaments prepared from compositions of the present invention by treatment with boiling water or bleaching treatment is relatively small and consequently, the stabilizing effects thereof are long lasting.

What is claimed is:

1. Polyurethane elastomeric compositions, stabilized against ultraviolet radiation, comprising:
    (a) a polyurethane elastomer; and
    (b) from about 0.1 to about 20% by weight, based on the weight of said polyurethane elastomer, of a benzophenone derivative having the formula:

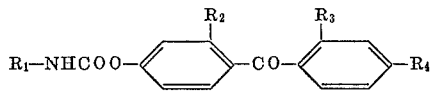

wherein $R_1$ is an alkyl group having from about 8 to about 20 carbon atoms; $R_2$ and $R_3$ each can be a hydroxyl or hydrogen, with the proviso that both $R_2$ and $R_3$ are not hydrogen simultaneously; $R_4$ is a member selected from the group consisting of hydrogen, halogen, alkoxy having 1 to about 20 carbon atoms, alkyl having 1 to about 20 carbon atoms and hydroxyl.

2. A composition according to claim 1, in which said benzophenone derivative is 4-benzoyl-3-hydroxyphenyl n-octadecylcarbamate.

3. A composition according to claim 1, in which said benzophenone derivative is 4-[2'-hydroxybenzoyl]-3-hydroxyphenyl n-decylcarbamate.

4. A composition according to claim 1, in which said benzophenone derivative is 4-benzoyl-3-hydroxyphenyl n-decylcarbamate.

5. A composition according to claim 1, in which said benzophenone derivative is 4-[4' - methylbenzoyl]-3-hydroxyphenyl n-octadecylcarbamate.

6. A composition according to claim 1, additionally containing a phenolic antioxidant.

7. A composition according to claim 6 wherein the antioxidant is o-(n-octyl-carbamyl)-4,4'-butylidene-bis-(3-methyl-6-tert.-butylphenol).

8. A composition according to claim 6 wherein the antioxidant is 4,4'-butylidene - bis(3-methyl-6-tert.-butylphenol).

References Cited

UNITED STATES PATENTS

| 2,984,645 | 5/1961 | Hoeschele | 260—45.8 |
| 3,322,818 | 5/1967 | Hanze | 260—479 |
| 3,351,608 | 11/1967 | Oertel et al. | 260—45.9 |

MAURICE J. WELSH, Primary Examiner

R. A. WHITE, Assistant Examiner

U.S. Cl. X.R.

260—45.95, 77.5 SS